United States Patent [19]
Mears et al.

[11] Patent Number: 5,930,012
[45] Date of Patent: Jul. 27, 1999

[54] POLARIZATION INDEPENDENT OPTICAL SWITCH

[75] Inventors: Robert Joseph Mears, Cambridge; Stephen Thomas Warr, Suffolk, both of United Kingdom

[73] Assignee: Cambridge University Technical Services, Ltd., Cambridge, United Kingdom

[21] Appl. No.: 08/817,333

[22] PCT Filed: Sep. 29, 1995

[86] PCT No.: PCT/GB95/02327

§ 371 Date: Jul. 24, 1997

§ 102(e) Date: Jul. 24, 1997

[87] PCT Pub. No.: WO96/10776

PCT Pub. Date: Apr. 11, 1996

[30] Foreign Application Priority Data

Sep. 30, 1994 [GB] United Kingdom ............ 9419757
Feb. 15, 1995 [GB] United Kingdom ............ 9502931

[51] Int. Cl.⁶ .............. G02B 5/32; G02B 6/37; G03H 1/08; G02F 1/13
[52] U.S. Cl. .............. 359/15; 359/9; 359/10; 359/25; 385/37; 349/201
[58] Field of Search ............. 359/1, 9, 10, 15, 359/20, 25, 572, 566, 569, 115, 117, 128, 130; 385/37; 349/201

[56] References Cited

U.S. PATENT DOCUMENTS 4,703,993  11/1987  Hinton et al. ............. 359/15
5,159,473  10/1992  Feldman ............. 359/15
5,182,665  1/1993  O'Callaghan et al. ............. 359/95

OTHER PUBLICATIONS

O'Callaghan, M.J., et al., "Diffractive Ferroelectric Liquid–Crystal Shutters for Unpolarized Light," *Optics Letters*, May 15, 1991, vol. 16, No. 10, pp. 770–772.

O'Brien, D.C., et al., "A Holographically Routed Optical Crossbar: Theory and Simulation," *Optical Computing & Processing*, Jul.–Sep., 1991, vol. 1, No. 3, pp. 233–243.

Warr, S.T., et al., "Polarisation Insensitive Operation of Ferroelectric Liquid Crystal Devices," *Electronics Letters*, Apr. 27, 1995, vol. 31, No. 9, pp. 714–716.

*Primary Examiner*—Jon Henry
*Attorney, Agent, or Firm*—Sughrue, Mion, Zinn, Macpeak & Seas, PLLC

[57] ABSTRACT

A polarisation independent optical switch is constituted by a light input (6), a diffractive and re-configurable liquid crystal device (8), a collimating lens (7) for distributing the input light over the liquid crystal device (8), a transform lens (9) receiving light from the liquid crystal device (8) and light output (6), wherein no polarisers are present between the light input and output. The diffractive and re-configurable liquid crystal device (8) may be formed as a liquid crystal spatial light modulator configured as a binary phase computer generated hologram with the holograms required to form broadcast, individual or multicast switching being re-generated using an iterative algorithm and then being recalled on demand. In one embodiment the switch has a folded configuration and includes a reflector (10) so that the light input and output are both on the same side of the liquid crystal device (8).

10 Claims, 3 Drawing Sheets

POLARIZATION INDEPENDENT OPTICAL SWITCH

TECHNICAL FIELD

Switches for optical fibre networks are increasingly important. One area of active development at present is the use of liquid crystal devices such as spatial light modulators (SLMs) in such switches. Nematic liquid crystals may be used but most of the recent work has been carried out using more modern liquid crystal materials such as ferroelectric liquid crystals (FLCs) or electroclinic liquid crystals (EC).

BACKGROUND ART

Each pixel in such liquid crystal devices acts as an independent rotatable waveplate, such that an applied voltage rotates the birefringent axes through an angle $2\theta$. Until now, the accepted mode of operation of such devices has been to arrange and correctly orient crossed polarisers around the device. Liquid crystal spatial light modulators may be configured as binary phase computer generated holograms (CGHs) which have particular application to free space diffraction based optical switching. This is described in detail in an article entitled "A holographically routed crossbar: Theory and simulation" by D. C. O'Brien, W. A. Crossland, and R. J. Mears, published in Optical Computing and processing, 1(3): 233–243, 1991. In this case, the ideal transmission of the device through crossed polarisers can be shown to be $$T + \sin^2 2\theta \sin k \, \Delta nd/2 \qquad (1)$$

where k is the wave number $2\pi/\lambda$, $\Delta n$ is the FLC birefringence and d is the FLC thickness. This is described in an article entitled "Programmable binary phase-only optical device based on ferroelectric liquid crystal SLM" by S. E. Broomfield, M. A. A. Neil, E. G. S. Paige, and G. G. Yang, published in Electronics Letters, 28(1):26–28, 1992. Unfortunately the intrinsic polariation sensitivity severely limits the use of such switches in normal optical fibre systems where polarisation is usually not preserved.

A special situation occurs provided the device is manufactured with half waveplate thickness and an aggregate electro-optic switching angle of $2\theta = 90°$. This is described in an article entitled "Diffractive ferro-electric liquid crystal shutters for unpolarized light", by M. J. O'Callaghan and M. A. Handschy, published in Optics Letters, 16(10):770–772, 1991. However few large angle materials exist and they are difficult to prepare; the alternate approach uses two layers of 45° material and this is described in an article entitled "Improved transmission in a two level, phase only, spatial light modulator", by M. A. Neil and E. G. S. Paige, published in Electronics Letters, 30(5):445–446, 1994.

DISCLOSURE OF INVENTION

According to this invention a polarisation independent optical switch comprises a light input, a diffractive and re-configurable liquid crystal device, a collimating lens for distributing the input light over the liquid crystal device, a transform lens receiving light from the liquid crystal device and a light output, wherein no polarisers are present between the light input and output.

Preferably, the defractive and reconfigurable liquid crystal device is formed as a liquid crystal spatial light modulator configured as a binary phase computer generated hologram with the holograms required to form broadcast, individual or multicast switching being re-generated using an iterative algorithm and then being recalled on demand.

In one embodiment, preferably, the switch has a folded configuration and includes a reflector so that the light input and output are both on the same side of the liquid crystal device and the collimating lens and transform lens are common. Typically the face of the liquid crystal device remote from the input and output is formed as a mirror.

In another embodiment, preferably, the switch comprises at least one reconfigurable liquid crystal spatial light modulator which is arranged so that light received at a first hologram is passed to the light output through a second hologram and wherein the second hologram is configured as the inverse of the first hologram.

In a first example, preferably two reconfigurable liquid crystal spatial light modulators are provided spaced apart in parallel planes and two transform lenses arranged between the two reconfigurable liquid crystal spatial light modulators and spaced apart a distance 2f, where f is the focal length of the transform lenses.

In a second example, preferably the switch has a folded configuration with the first and second holograms arranged in different regions of a single reconfigurable liquid crystal spatial light modulator and includes a reflector spaced a distance f from the transform lens, where f is the focal length of the transform lens, so that the light input and output are both on the same side of the reconfigurable liquid crystal spatial light modulator. Typically the reflector is formed as a mirror.

Preferably, the light output is formed by an array of output optical fibres. The light input may be formed by a single input optical fibre where the switch has a one-to-many configuration or again by an array of input optical fibres where the switch has a many-to-one or many-to-many configuration.

The least possible optical loss in the switch can be achieved by having the switching angle of the liquid crystal to be as close as possible to 90° because this maximises the phase modulation. However, it is difficult to prepare liquid crystal materials with such a large switching angle and, in general, the greater the switching angle the slower the response speed of the switch. Accordingly, because the switch is polarisation insensitive irrespective of the switching angle of the liquid crystal, it is possible to use commonly available low switching angle materials with the trade off of an increase in switching speed at the expense of some optical loss through the switch. This trade off may be extended by using electroclinic liquid crystals which, in spite of having only small switching angles, typically between 2° and 10° switch at speeds which are at least an order of magnitude greater than ferro-electric liquid crystals.

BRIEF DESCRIPTION OF DRAWINGS

The theory behind and two embodiments of an optical switch in accordance with this invention will now be described with reference to the accompanying drawings, in which.

DETAILED DESCRIPTION

The normalised complex field amplitude Ê, of an arbitrary electromagnetic travelling wave $$E = Re\{\hat{E}\exp(j(\omega t - kz + \delta))\},$$

may be written in vectorised form $[E_x \ E_y \exp(j\phi)]$ where $\phi$ is the relative phase between orthogonal axes of polarisation (x, y) and $E_{x2} \times E_{y2} = 1$. Thus $\hat{E}$ encompasses all states of polarisation, i.e. any direction of plane polarised light ($\phi=0$ or $\pi$); circular polarisation ($X=Y$, $\phi=\pm\pi/2$), or any other elliptical state.

Figure 1:
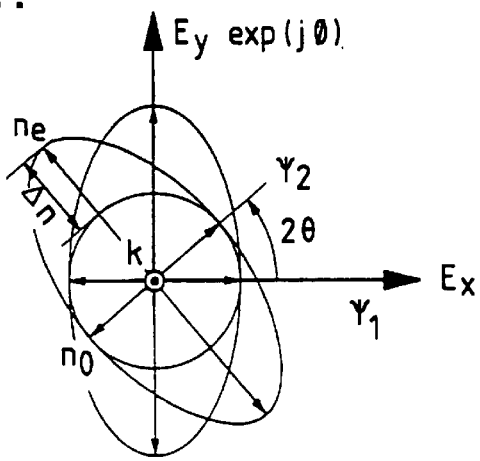
FIG. 1 is a diagram showing the optical indicatrix of an electric field incident upon a birefringement slab.

FIG. 1 is the optical indicatrix of this field incident on a birefringement slab of material such as FLC, of thickness d (not shown). The fast and slow axes ($n_o$, $n_e$) of the material are inclined at an angle $\phi$ to (x, y) and the k-vector of propagation points out of the page. The Jones polarisation matrix along ($n_o$, $n_e$) and a rotation matrix for co-ordinate changes may be defined as:

$$J = \begin{pmatrix} \exp(jk\Delta nd) & 0 \\ 0 & 1 \end{pmatrix}, \quad R = \begin{pmatrix} \cos 2\theta & \sin 2\theta \\ -\sin 2\theta & \cos 2\theta \end{pmatrix}$$

The input field is propagated through two FLC pixels in opposite switched states, $\omega_1$ and $\omega_2$. One state may be chosen to lie along the x axis since the input polarisation is arbitrary. Thus $\omega_1 = 0$ and $\omega_2 = 2\theta$, leading to two output fields arbitrarily resolved parallel and perpendicular to $\omega_2$ with the form:

$$\hat{E}_1 = RJ\hat{E}^T = \begin{pmatrix} c_1 + c_2 \exp(jk\Delta nd) \\ c_3 + c_4 \end{pmatrix},$$

$$\hat{E}_2 = JR\hat{E}^T = \begin{pmatrix} c_1 + c_2 \\ c_3 \exp(jk\Delta nd) + c_4 \end{pmatrix}$$

where $c_1$ to $c_4$ may be calculated. It may be seen that each field component consists of a phase modulated term $c_2$ or $c_3$, and a fixed 'DC' term $c_1$ or $c_4$. The binary pattern displayed on the SLM and its far field replay are related by a Fourier transform containing an undiffracted zero order solution:

$$\{a_{dc} + a_{ac} CGH(l, y)\} \leftrightarrows a_{dc}\delta(u, v) + a_{ac}\theta(u, v)$$

where CGH(x, y) consists of equal numbers of ±1 representing the two FLC states and the integrated power in f(u,v) is unity. The normalised field ratios of the zero and non-zero order are derived from the propagated fields $a_{dc} = |\frac{1}{2}(\hat{E}_1 + \hat{E}_2)|$ and $a_{dc} = |\frac{1}{2}(\hat{E}_1 - \hat{E}_2)|$ such that $a_2^{dc} + a_2^{ac} = 1$. Observing the independentce of orthogonal polarisations:

$$a_{ac}^2 = \left(\left|\frac{1}{2}c_2\right|^2 + \left|\frac{1}{2}c_3\right|^2\right) \times |1 - \exp(jk\Delta nd)|^2 = \sin^2 2\theta \sin^2 k\Delta n \frac{d}{2} \quad (2)$$

Equation (2) represents the proportion of power diffracted by the device and is identical to the binary phase transmission between polarisers, Equation (1). Normally with crossed polarisers arranged around the SLM, the 'DC' terms are removed (at the second polariser) and π-phase modulation is achieved by setting $E_x = \cos\theta$, $E_y = \pm\sin\theta$ and $\phi = 0$ such that the input linear polarisation lies symmetrically between $\omega_1$ and $\omega_2$.

We have shown that removal of polarisers from an FLC device leaves the replay field unaltered other than the addition of an on axis zero order solution. This result is very significant for diffractive switching applications: polarisation dependence is removed; signal fading due to polarisation drift is avoided and light throughput is increased by eliminating losses in real polarising materials. For any given device, the proportion of power in the diffracted field remains constant for any input polarisation state. The efficiency may be increased by optimising the FLC thickness and switching angle.

A simple experimental set up using a transmissive SLM with 128×128 multiplexed pixels on a 220 $\mu$m pitch has been shown to verify the above result. The input source was provided by a 633 nm HeNe laser coupled into single mode fibre. The output beam was collimated by a 125 mm lens, passed through the SLM and finally through a transform lens to form the Fraunhofer replay field on a CCD camera.

Figure 2A:
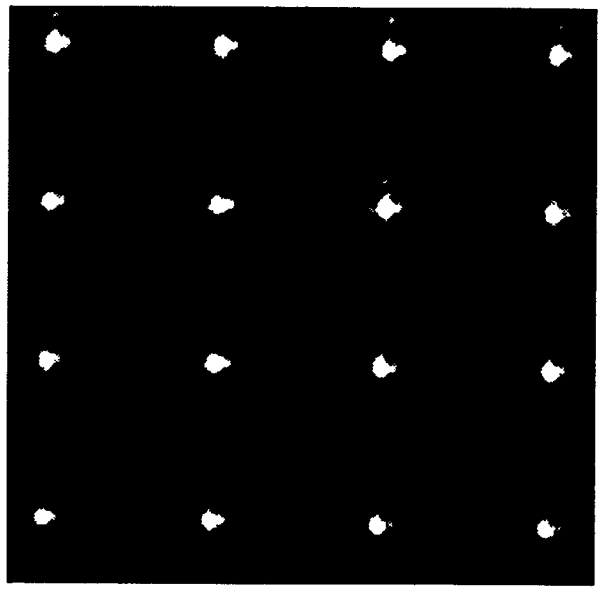
FIGS. 2a and 2b are photographic representations of the replay field of the output of the FLC device both with and without polarisers present in the system, respectively.
Figure 2B:
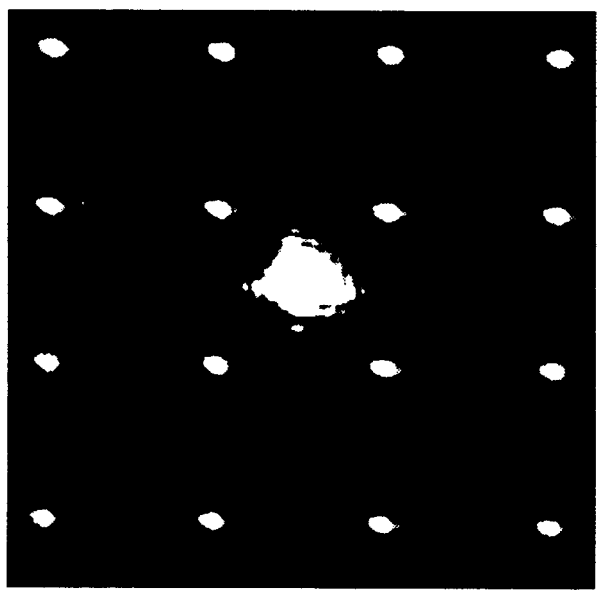

With crossed polarisers correctly aligned around the SLM and an array generating CGH displayed, micro-bending induced polarisation changes in the input fibre caused the intensity of the reply field spots to fluctuate almost to zero. After removal of polarisers, the replay field was 2.3 dB brighter due to removal of polarisation losses and the optical quality improved. Micro-bending the input fibre had no effect on the replay pattern, as illustrated in FIGS. 2a and 2b.

The SLM has a measured switching angle of 28° so that the zero order spot was considerably brighter than the diffracted spots—sufficient to saturate part of the CCD array and cause charge leakage. Reduction of the input power showed this central spot to have exactly the same beam diameter as the diffracted spots.

In many systems, the existence of an undiffracted zero order can simply be ignored or may even be used to monitor the input provided the CGH always directs light away from it, since the zero order remains a constant fraction of the input power.

The removal of polarisation dependence makes FLC devices much more attractive in communication networks where the input state is uncontrolled. A broadcast one to many single mode fibre fan out coupler using a fixed CGH has been demonstrated as described in an article entitled "Binary phase gratings for hexagonal array generation", by N. C. Roberts, A. G. Kirk and T. J. Hall, published in Optics Communications, 94: 501–505, 1992. By replacing the fixed CGH with a FLC device, a one to many dynamic fibre switch may be constructed which includes multicast and broadcast capability through appropriate CGH design.

Figure 3:
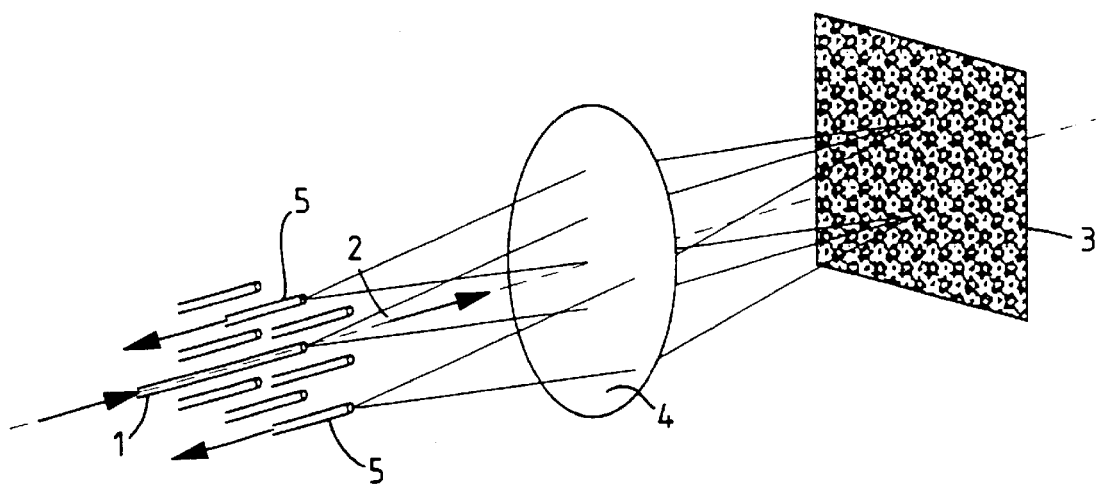
FIG. 3 is an optical diagram of one embodiment of the optical switch.

FIG. 3 shows the basic principle of this switch. The input fibre 1 is placed on the optic axis 2 and illuminates the SLM 3 via a transform lens 4. The input may require an opto-isolator to prevent the reflected zero order destabilising the source. The output single mode fibres 5 are arranged in the same plane as the input 1 and a CGH is displayed to diffract light to them as desired. The set of CGHs required can be pre-generated using an iterative algorithm and recalled on demand.

The absence of polarisers and use of a reflective SLM 3 produces a very compact co-linear 2f architecture with good stability since the input/output fibre array can be constructed as a single element. As a demonstration of switching, a 4f architecture has been constructed using the same transmissive SLM as above followed by a matching 125 mm transform lens. The CCD was replaced with two off axis single mode output fibres and the switch used to interconnect to either, both or neither of the outputs.

The experimental switch exhibits 35 dB crosstalk noise rejection and has a measured insertion loss of −13.8 dB. The fibre to fibre coupling loss is −3.1 dB including all glass surfaces. The CGH diffraction efficiency is −4.1 dB glass surfaces. The CGH diffraction efficiency is −4.1 dB taking account, of all non-zero diffraction orders.

Figure 4:
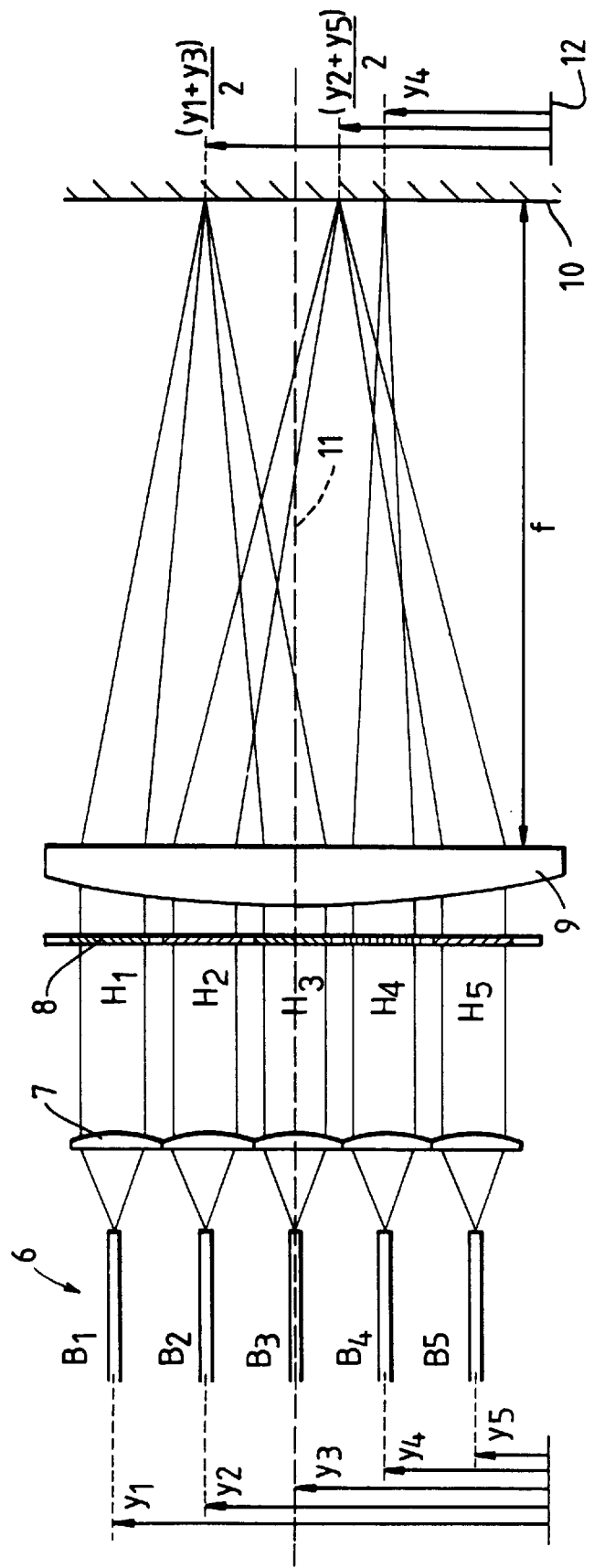
FIG. 4 is an optical diagram of another embodiment of the optical switch.

FIG. 4 shows a switch having a folded geometry comprising an array 6 of bi-directional input source/output receivers, each being provided with a collimating lens 7 for distributing input light over a region of a reconfigurable spatial light modulator 8 lying in a diffraction plane. A transform lens 9 common to all regions of the reconfigurable spatial light modulator 8 receives light from these regions and transmits the light to a plane mirror 10 spaced apart from the transform lens 9 by a distance f, where f is the focal length of the transform lens 9.

The geometry of the switch of FIG. 4 is arranged such that the far field pattern formed on the plane mirror 10 has an extent of 2f $\theta_{max}$.

This ensures that all possible connection patterns may be realised. For example if $B_1$ were to be connected back to itself, the spot of light from $B_1$ formed on the mirror 10 would have to be reflected from the mirror 10 at a height just slightly less than f $\theta_{max}$ above the optical axis 11.

The single transform lens 9 is typically implemented as a high quality multi-element lens system and to meet the 2f $\theta_{max}$ field size requirement, a telescopic magnification stage or other magnification optics may be required. Alternatively, effective magnification may be built into the system by imaging a smaller field onto the mirror 10 and by curving the mirror surface.

Bi-directional light from input source and output receiver $B_1$ placed at a height $y_1$ above some arbitrary reference line, is shown being collimated by a lens 7 and then passing through the spatial light modulator 8. This region of the spatial light modulator 8 is displaying hologram $H_1$ which deflects the beam through a small angle (not shown) such that after being refracted by the transform lens 9 and having travelled a distance f, a spot is formed at a height of $(y_1+y_3)/2$ above a reference line 12, where $y_3$ is the height above the reference line 12 of the current destination for $B_1$. The light spot is reflected off the plane mirror 10, travels back through the transform lens 9 and arrives at a different region of the spatial light modulator 8 which is displaying hologram $H_3$. The light arrives at $H_3$ as a collimated beam. $H_3$ is configured as the inverse of $H_1$ such that the light is focused onto $B_3$ by the lens and is travelling in a direction parallel to the optical axis of the system. Accordingly, the output receiver only requires a low numerical aperture. Likewise, light from $B_2$ is currently destined for $B_5$ and so is deflected to a height $(y_1+y_5)/2$ by hologram $H_2$.

In a modification to this type of structure (not shown), the switch comprises two detractive planes of configurable spatial light modulators with a pair of transform lenses spaced apart a distance 2f between the defractive planes. The far field diffraction distribution of the inputs is formed in the plane exactly mid-way between the lenses. In this example, light from one of an array of input sources is directed to a particular one of an array of output sources via two reconfigurable spatial light modulators, one of which is configured as the inverse hologram of the other.

We claim:

1. A polarisation independent optical switch comprising a light input (6), a diffractive and re-configurable liquid crystal device (8), a collimating lens (7) for distributing the input light over the liquid crystal device (8), a transform lens (9) receiving light from the liquid crystal device (8) and a light output (6), wherein no polarisers are present between the light input and output, characterised in that the diffractive and reconfigurable liquid crystal device (8) is a liquid crystal spatial light modulator configured as a computer generated hologram and wherein a change in switched state of an area of the spatial light modulator causes a change in the state of polarisation of light which emerges from that area of the spatial light modulator.

2. An optical switch according to claim 1, in which the diffractive and reconfigurable spatial light modulator (8) is arranged to generate a plurality of holograms ($H_1$ to $H_5$).

3. An optical switch according to claim 1, in which the switch comprises at least one reconfigurable liquid crystal spatial light modulator (8) which is arranged so that light received at a first hologram ($H_1$) is passed to the light output (6) through a second hologram ($H_3$) and wherein the second hologram ($H_3$) is configured as the inverse of the first hologram ($H_1$).

4. An optical switch according to claim 3, in which the switch has a folded configuration with the first and second holograms arranged in different regions of a single reconfigurable liquid crystal spatial light modulator (8) and includes a reflector spaced a distance f from the transform lens (9), where f is the focal length of the transform lens (9), so that the light input and output (6) are both on the same side of the reconfigurable liquid crystal spatial light modulator (8).

5. An optical switch according to claim 3, comprising in two reconfigurable liquid crystal spatial light modulators (8) spaced apart in parallel planes and two transform lenses (9) arranged between the two reconfigurable liquid crystal spatial light modulators (8) and spaced apart a distance 2f, where f is the focal length of the transform lenses.

6. An optical switch according to claim 1, in which the switch has a folded configuration and includes a reflector (10) so that the light input and output (6) are both on the same side of the liquid crystal device (8) and the collimating lens and transform lens are common (4).

7. An optical switch according to claim 1, in which the light output (6) is formed by an array of output optical fibres.

8. An optical switch according to claim 1, in which the light input is formed by a single input optical fibre where the switch has a one-to-many configuration.

9. An optical switch according to claim 1, in which the light input is formed by an array of input optical fibres where the switch has a many-to-many configuration.

10. An optical switch according to claim 1, in which the light input is formed by an array of input optical fibre where the switch has a many-to-one configuration.

* * * * *